United States Patent
Nguyen et al.

(10) Patent No.: US 8,443,357 B2
(45) Date of Patent: May 14, 2013

(54) PATCHING OF MULTI-LEVEL DATA CONTAINERS STORING PORTIONS OF PRE-INSTALLED SOFTWARE

(75) Inventors: PhiDien Ha Nguyen, San Jose, CA (US); Vijay Nichinbatl Sriram, Bangalore (IN); Shamik Ganguly, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 1117 days.

(21) Appl. No.: 12/250,537

(22) Filed: Oct. 13, 2008

(65) Prior Publication Data

US 2010/0095289 A1   Apr. 15, 2010

(51) Int. Cl.
G06F 9/44 (2006.01)
(52) U.S. Cl.
USPC .......................................... 717/169; 717/175
(58) Field of Classification Search .......... 717/101–178; 707/747; 709/221, 238, 247
See application file for complete search history.

(56) References Cited

U.S. PATENT DOCUMENTS

| 6,434,744 | B1 * | 8/2002 | Chamberlain et al. | 717/168 |
|---|---|---|---|---|
| 6,449,764 | B1 * | 9/2002 | Sliger et al. | 717/170 |
| 6,535,894 | B1 * | 3/2003 | Schmidt et al. | 1/1 |
| 7,127,712 | B1 | 10/2006 | Noble et al. | |
| 7,136,878 | B2 | 11/2006 | Abdallah et al. | |
| 7,506,244 | B1 * | 3/2009 | Qin et al. | 715/229 |
| 7,640,363 | B2 * | 12/2009 | Teodosiu et al. | 709/247 |
| 7,823,147 | B2 * | 10/2010 | Moshir et al. | 717/173 |
| 7,827,182 | B1 * | 11/2010 | Panigrahy | 707/747 |
| 7,934,211 | B2 * | 4/2011 | Nguyen et al. | 717/168 |
| 2002/0174422 | A1 * | 11/2002 | Kelley et al. | 717/178 |
| 2003/0033597 | A1 * | 2/2003 | Allsop et al. | 717/169 |
| 2003/0050932 | A1 * | 3/2003 | Pace et al. | 707/100 |
| 2005/0234987 | A1 * | 10/2005 | Cyphers | 707/104.1 |
| 2006/0036654 | A1 * | 2/2006 | Abdallah et al. | 707/200 |
| 2006/0064685 | A1 * | 3/2006 | DeFolo | 717/169 |
| 2006/0101457 | A1 * | 5/2006 | Zweifel et al. | 717/174 |
| 2006/0253849 | A1 * | 11/2006 | Avram et al. | 717/172 |
| 2006/0294430 | A1 * | 12/2006 | Bunker et al. | 714/38 |
| 2007/0006209 | A1 * | 1/2007 | Nguyen et al. | 717/168 |

(Continued)

OTHER PUBLICATIONS

"John R. Hines", Deploying and Removing Patches for Java Applications, "http://www2.sys-con.com/itsg/virtualcd/Java/archives/0601/hines/index.html", Copyright Date: 2004, pp. 1-5.

(Continued)

*Primary Examiner* — Lewis A Bullock, Jr.
*Assistant Examiner* — Francisco Aponte
(74) *Attorney, Agent, or Firm* — Narendra Reddy Thappeta (57) ABSTRACT

A computing system provided according to an aspect of the present invention includes a developer system which sends a set of patches along with metadata in a package. The metadata may include hierarchical paths, with each path indicating a corresponding target (file or archive) which is to be replaced to apply the corresponding patch. A patch tool receives the package and applies the patches using the metadata. According to another aspect of the present invention, a patch tool forms a tree structure based on the hierarchical paths in the metadata. In an embodiment, the tree structure is traversed each time to perform a corresponding patching operation (e.g., backup, and replace). According to yet another aspect of the present invention, only the required archives are unarchived while applying the patches. In an embodiment, the patch tool determines the required archives based on the information in the received metadata.

20 Claims, 6 Drawing Sheets

U.S. PATENT DOCUMENTS

| | | | |
|---|---|---|---|
| 2007/0038991 A1* | 2/2007 | Schuft et al. | 717/172 |
| 2007/0113225 A1* | 5/2007 | Felts | 717/172 |
| 2008/0178173 A1* | 7/2008 | Sriram et al. | 717/176 |
| 2009/0144716 A1* | 6/2009 | Felts | 717/168 |

OTHER PUBLICATIONS

Nested Archive Toolkit for Java, "http://www.alphaworks.ibm.com/tech/nestedarchive", Dated: May 16, 2006, p. 1.

"Daniel Palomo Van", "PRED", "http://pred.sourceforge.net/", Copyright Date: 2004, p. 1.

"Sun Micro Systems, Inc", "Updating a Jar File". "http://webcem01.cem.itesm.mx:8005/web/java/tutorial/deployment/jar/update.html", Copyright Date: 1995-2008, pp. 1-2.

"Craig", "Zip Up Files From the Command Line" "http://www.codejacked.com/zip-up-files-from-the-command-line/", Dated: Jun. 11, 2007, pp. 1-5.

* cited by examiner

```
331: <metadata>
332:   <jar name="petapp.ear:helpers.jar"
333:     path="%SWISH_HOME%/deploy/jlib"
334:     class_name="deploy/jlib/petapp.ear/logic/helpers.jar/security/user/userhelper.class"/>
335:   <jar name="petapp.ear:interface.war:xul2.jar"
336:     path="%SWISH_HOME%/deploy/jlib/"
337:     class_name="deploy/jlib/petapp.ear/interface.war/ui/decl/xul2.jar/acme/login.class"/>
338:   <jar name="petapp.ear:helpers.jar:"
339:     path="%SWISH_HOME%/deploy/jlib"
340:     class_name="deploy/jlib/petapp.ear/logic/helpers.jar/business/shoppingcart.jar"/>
341: </metadata>
```

PATCHING OF MULTI-LEVEL DATA CONTAINERS STORING PORTIONS OF PRE-INSTALLED SOFTWARE

BACKGROUND OF THE INVENTION

1. Technical Field

The present disclosure relates to software maintenance, and more specifically to patching of multi-level data containers storing portions of pre-installed software.

2. Related Art

Pre-installed software represents software code/instructions that have been installed in a system. Installation typically entails storing the software code/instructions in appropriate storage locations and performing any other action(s) required to make the code/instruction ready for execution. The software code/instructions constituting the pre-installed software are often maintained in the form of one or more files for convenient storage, execution, etc.

A data container represents a collection of files storing at least some portions of the pre-installed software. The data container may be maintained in the form of a single file, for example, as an archive file containing the collection of files. The process of creating the single archive file/data container from the collection of files (with/without compression) is termed "archiving", while the reverse process of retrieving the collection of files from the single file/data container (with/without decompression) is termed "unarchiving".

Archiving is typically performed to simplify aspects such as storage, transporting (e.g., download) and general ease of management. Unarchiving is then performed so that the individual ones of the files are available for use. In other words, to perform various operations (e.g., backup, replace, etc.) related to patching, it is generally necessary to first extract/separate the individual files of the corresponding archive.

Multi-level data containers are also often used to store a desired collection of files. A multi-level data container implies that there is at least one data container, which is included as a file of the multi-level data container. There can be another data container as a file in such a lower level data container. In the present application, each such data container is identified with a level-number, implying that the data container at that level number contains at least one data container at the level number less one.

As an illustration, a first level data container is deemed to not contain any data containers as files, while a second level data container would contain at least one first level data container. Similarly, a third-level data container may contain other first/second level data containers; a fourth-level data container may contain other first/second/third level data containers. It should be appreciated that there can be several files at each of the levels, as is suited for the specific situation.

There is a general need to provide for patching of multi-level data containers. Patching refers to replacement of desired data/instructions in the pre-installed software with corresponding corrected data/instructions (often referred to as patches). The replacements are generally intended to either fix errors or improve the performance of the pre-installed software.

It is generally desirable that patching be provided for multi-level data containers, while meeting one or more of requirements, as suited in the specific environments.

BRIEF DESCRIPTION OF THE DRAWINGS

Example embodiments of the present invention will be described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DESCRIPTION OF THE EXAMPLE EMBODIMENTS

1. Overview

A computing system provided according to an aspect of the present invention includes a developer system which sends a set of patches along with metadata in a package. The metadata may include hierarchical paths, with each path indicating a corresponding target (file or archive) which is to be replaced to apply the corresponding patch. A patch tool receives the package and applies the patches using the metadata. Several benefits such as one or more of reduced processing time and complexity may be obtained by use of such metadata.

According to another aspect of the present invention, a patch tool forms a tree structure based on the hierarchical paths in the metadata. The tree structure is traversed to perform corresponding patching operations (e.g., backup, and replace). By forming a tree structure, the number of times an archive is unarchived may also be reduced (at least in approaches when all the archives of a multi-level archive are not unarchived), thereby reducing resource requirements (memory, computations, etc.).

According to yet another aspect of the present invention, only the required archives are unarchived while applying the patches. In an embodiment, the patch tool determines the required archives based on the information in the received metadata.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the features of the invention.

2. Example Environment

Figure 1:
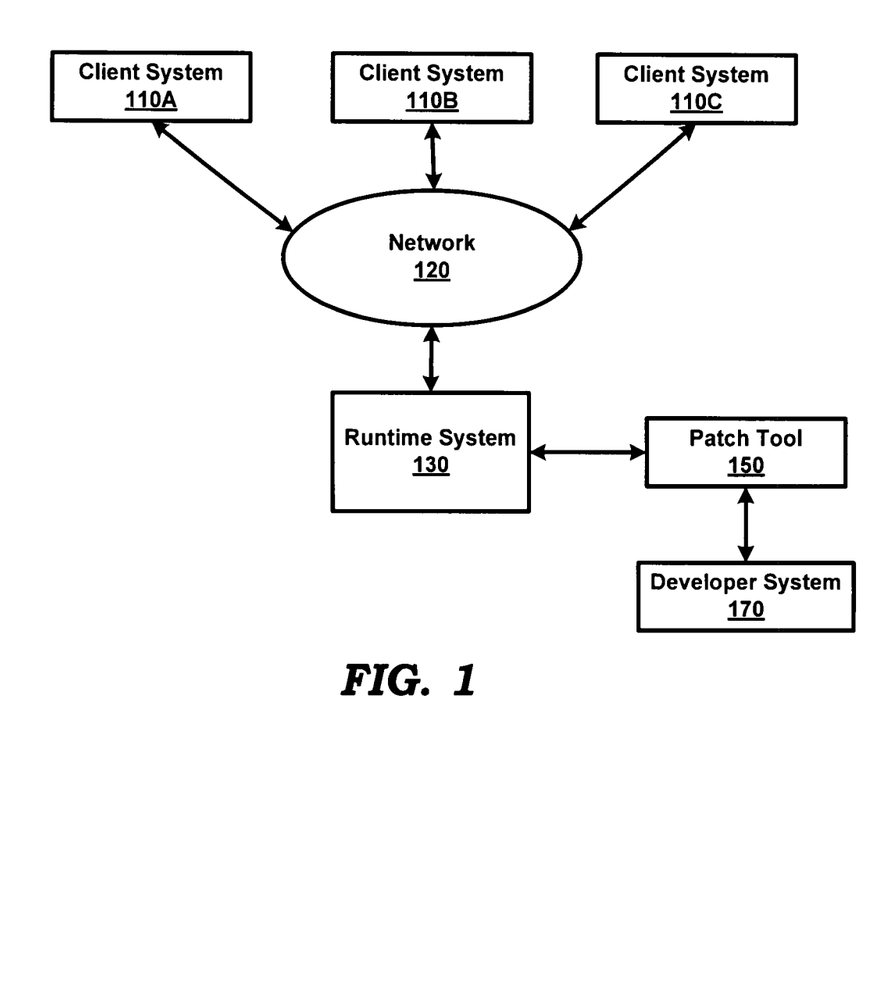
FIG. 1 is a block diagram illustrating the details an example computing system in which several aspects of the present invention can be implemented.

FIG. 1 is a block diagram illustrating an example environment in which several aspects of the present invention can be implemented. The block diagram is shown containing client systems 110A-110C, network 120, runtime system 130, patch tool 150, and developer system 170.

Merely for illustration, only representative number/type of systems are shown in FIG. 1. Many environments often contain many more systems, both in number and type, depending on the purpose for which the environment is designed. Each system/device of FIG. 1 is described below in further detail.

Network 120 provides necessary communication between various client systems 110A-110C and runtime system 130. Network 120 may be implemented using protocols such as Internet Protocol (IP) that is very well known in the relevant arts. In general, in IP environments, an IP packet is used as a basic unit of transport, with the source address being set to the IP address assigned to the source system from which the packet originates and the destination address set to the IP address of the target system to which the packet is to be eventually delivered.

Each of client systems 110A-110C represents a system such as a personal computer, workstation, mobile station, etc., used by a user to send (client) requests to applications executing in runtime system 130. The requests may be generated using appropriate interfaces. In general, a client system requests an application for performing tasks and receives corresponding responses containing the results of performance of the requested tasks.

Runtime system 130 represents a server, such as a web/application server, which executes applications capable of performing the tasks requested by users using one of client systems 110A-110C. The applications may be pre-installed in a state ready for execution and may be executed for performing the requested tasks, for example, in response to receiving a first client request. Runtime system 130 may send the results of performance of the requested tasks as corresponding responses to the requesting client system. Runtime system 130 may also contain other software programs such as operating system, device drivers, etc., (not shown) that provides a (common) run time environment facilitating the execution of the pre-installed applications.

It may be appreciated that during the performance of tasks by the applications/software pre-installed in the runtime system, various errors may be discovered. These errors may include logical errors (due to wrong logic), functional errors (due to the software not performing/functioning as expected) or runtime errors (due to problems with the environment in which the software is executed). Such errors (as well as any others detected) may require changes to be made to the software instructions constituting the pre-installed software/applications.

Developer system 170 enables developers/users to generate patches to fix various errors in the pre-installed software executing in runtime system 130. The patches typically contain data elements, which replace corresponding data elements in the pre-installed software in runtime system 130. The data elements may represent software instructions, data or database schema type definitions, which fix different errors of the pre-installed software/applications. As described below in further detail, developer system sends a package containing a desired set of patches and a meta-data, which simplify application of the patches.

Patch tool 150 represents a system, which processes the package to apply patches received from developer system 170 to the software/applications pre-installed in runtime system 130, according to several aspects of the present invention. In general, patch tool 150 is implemented consistent with the format and conventions used in forming patches by developer system 170. Though patch tool 150 is shown external to runtime system 130, patch tool 150 may be integrated with runtime system 130 (or with developer system 170) as will be apparent to one skilled in the relevant arts by reading the disclosure provided herein.

It may be appreciated that portions of the software/applications pre-installed in runtime system 130 may be stored in the form of one or more multi-level data containers. The files in the data containers may be executed during execution of the pre-installed software/applications. Accordingly, patching of the pre-installed software may entail replacement of code/instructions contained in the multi-level data containers in runtime system 130 (using appropriate patches received from developer system 170).

In one prior approach, the patching of a multi-level data container may require unarchiving of data containers at all levels to retrieve the code/data files, applying the patches to the appropriate files and archiving of the modified files to generate the modified/patched multi-level data container. Such an approach often requires considerable time and/or resources, especially when a large number of patches are sought to be applied to the same multi-level data container.

Patch tool 150, provided according to various aspects of the present invention, enables patching of multi-level data containers, while overcoming some of drawbacks described above. The manner in which patch tool 150 enables patching of a single multi-level data container is described below with examples.

3. Patching of a Multi-Level Data Container

Figure 2:
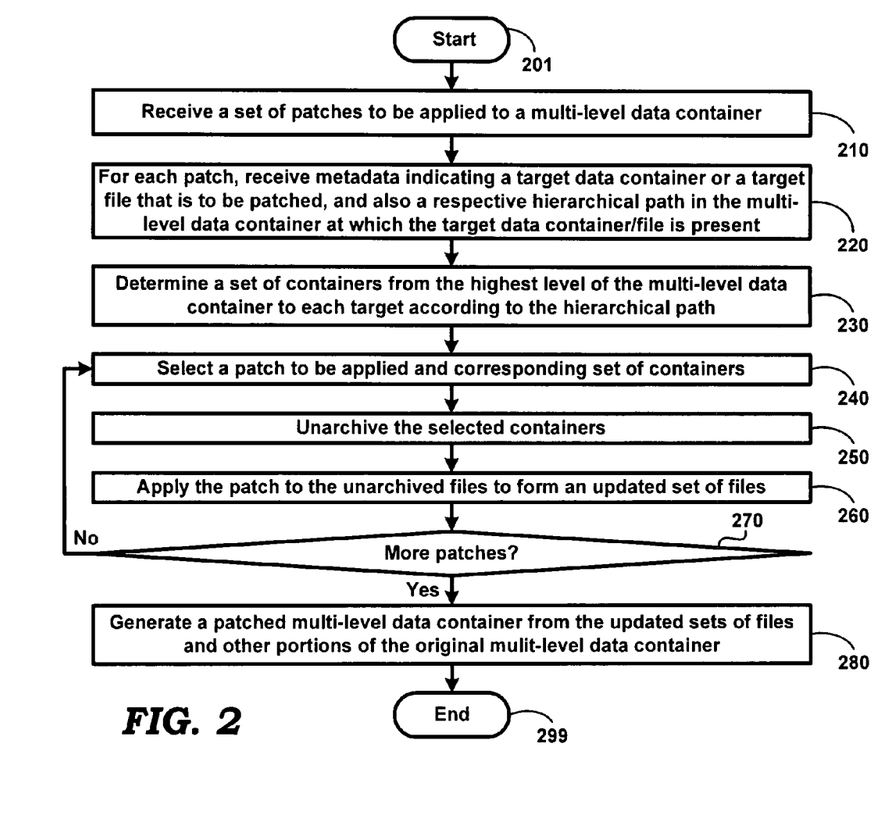
FIG. 2 is a flowchart illustrating the manner in which patching of a multi-level data container storing portions of pre-installed software is performed in an embodiment of the present invention.

FIG. 2 is a flowchart illustrating the manner in which patching of a multi-level data container storing portions of pre-installed software is performed according to an aspect of the present invention. The flowchart is described with respect to FIG. 1 merely for illustration. However, various features can be implemented in other environments also without departing from the scope and spirit of various aspects of the present invention, as will be apparent to one skilled in the relevant arts by reading the disclosure provided herein.

In addition, some of the (sub) steps may be performed in a different sequence than that depicted below, as suited in the specific environment, as will be apparent to one skilled in the relevant arts. Many of such implementations are contemplated to be covered by several aspects of the present invention. The flow chart begins in step 201, in which control immediately passes to step 210.

In step 210, patch tool 150 receives a set of patches to be applied to a multi-level data container. The patches may be received from developer system 170 (in a pre-specified format). In step 220, for each patch, patch tool 150 also receives metadata indicating a target data container or a target file (referred to generally as a 'target') that is to be patched, and also a respective hierarchical path in the multi-level data container at which the target data container or file is present. The metadata may be received from developer system 170 (in a pre-specified format) and may be maintained in patch tool 150 and/or runtime system 130. The patches and the metadata may be received contained in a single package.

The target represents the data container or file that is to be replaced (or patched) by the application of the corresponding patch from the received set of patches. The hierarchical path represents specific path, which indicates the directories and/or archives that are in the path from the root to the target. The package may be received in the form of a single data unit, or alternatively, portions of the metadata (corresponding to each of the patches in the patch set) may be received and assembled together to generate the metadata for all the patches sought to be applied.

In step 230, patch tool 150 determines a a set of containers that are present from the highest level of the multi-level data container to each target according to the hierarchical path in the received metadata. In one embodiment described above, the metadata indicates specific paths, which identify the directories and/or archives that are required for patching and patch tool 150 is designed to process the metadata to determine the indicated portions. However, various other conventions can be used to identify the portions of multi-level data container that are required for patching, as will be apparent to one skilled in the relevant arts by reading the disclosure provided herein.

It may be appreciated that the target data containers or files may be contained in other higher level data containers forming portions of the multi-level data container. As such, application of the patch to the target data containers/files may require the portions (containing the determined set of archives in the path) to be determined for unarchiving. Accordingly, patch tool 150 may determine the respective portions from the highest level of the multi-level data container to the target data container or the target file that are (needs) required for applying the one or more received patches.

In step 240, patch tool 150 selects a patch to be applied and the corresponding determined set of containers. The selection can be performed using one of several approaches, as will be apparent to one skilled in the relevant arts by reading the disclosure provided herein. Thus, though the description of sections below is provided to select based on traversal of a tree, the patch and set of containers can be determined using alternative approaches as well.

In step 250, patch tool 150 unarchives the selected set of data containers. Patch tool 150 identifies all the data containers in the determined portion (from the highest level of the multi-level data container to the target) and unarchives the identified data containers in order to access (and make available for further processing) the target for the application of patches. It may be noted that during such identification there could be directories containing the data containers or files in the determined portion.

Unarchiving an archived file, retrieves (extract) the individual files from the archive as explained above in the background section. Unarchiving is performed to access (reach) the target file or target container on which the selected patch is to be applied. The target data container or the target file may be at any level in the multi-level data container and as such it may be required to unarchive the data containers at different levels based on the determined portion. However it may be noted that if the target is a data container then the data containers above the target container in the hierarchy are unarchived and the target itself is not unarchived.

In step 260 patch tool 150 applies selected patch to the unarchived files to form an updated set of files. In general, applying entails replacing the target with a file received as a part of the patch.

In step 270, patch tool 150 checks and determines if there are more patches are to be applied to the multi level data container. If more patches are to be applied then the control passes to step 240 and the next patch along with the corresponding determined portions are selected, if not the control passes to step 280.

In step 280, patch tool 150 generates (by archiving) a patched multi-level data container from the modified portions and other portions/containers of the original multi-level data container (which were not further unarchived for the application of the patches). The patched multi-level data container now forms part of the pre-installed software in runtime system 130. The flow chart ends in step 299.

From the above, it may be appreciated that the application of patches may entail the unarchiving of only the required archives, in contrast to a prior approach that require the multi-level data container to be unarchived entirely. The approach of above may be modified or extended according to additional features to obtain other benefits, as described below with an example.

4. Example Illustrating Patching of Multi-Level Data Containers

Figure 3A:
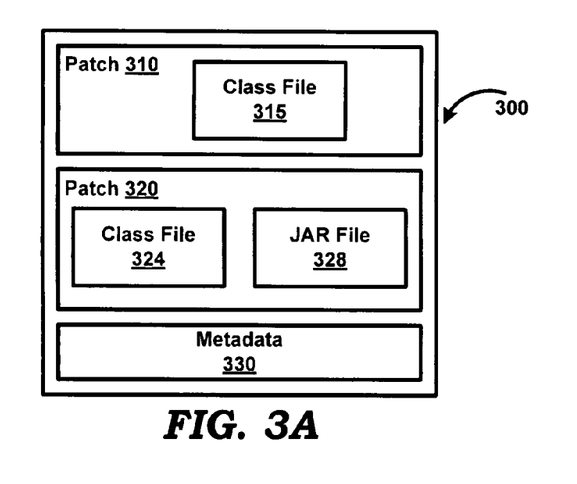
FIG. 3A is a block diagram illustrating the manner in which patches are received in one embodiment.
Figure 3B:
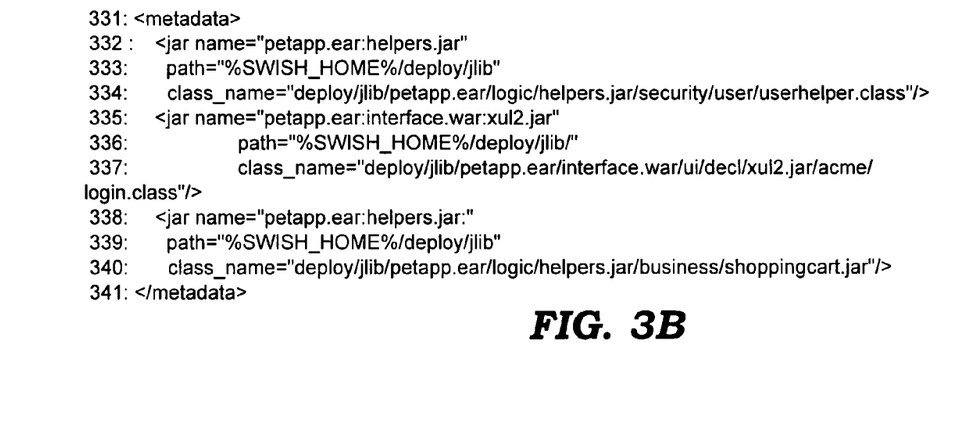
FIG. 3B depicts the format of metadata received along with the patches in one embodiment.
Figure 3C:
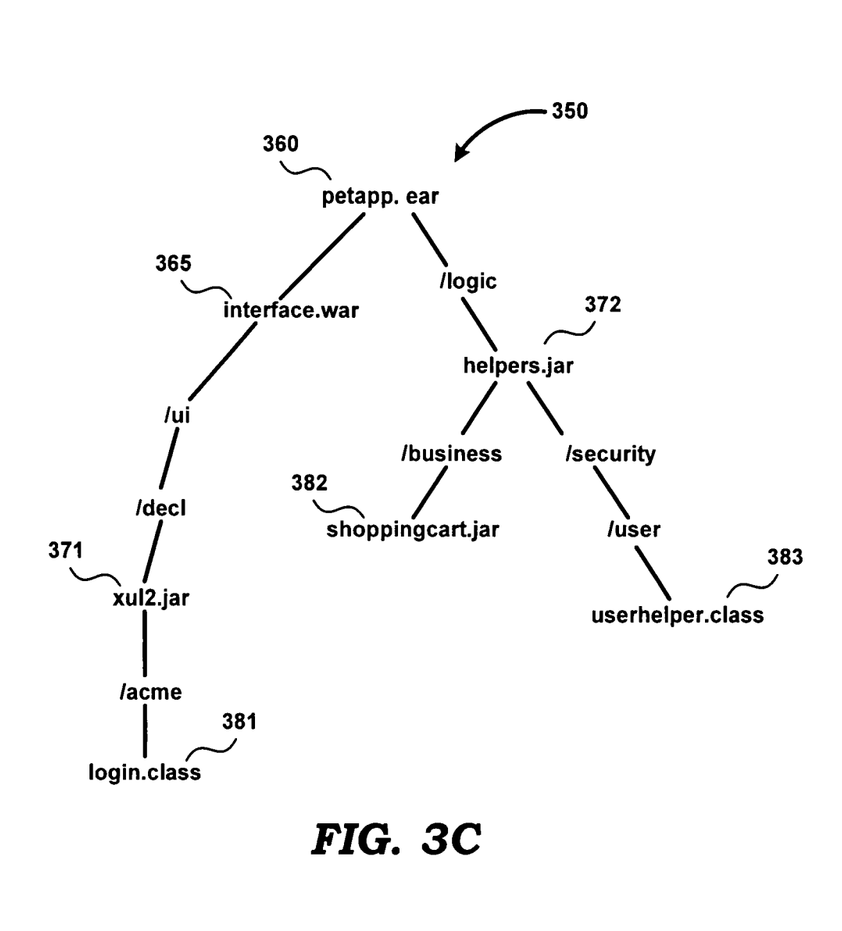
FIG. 3C depicts a tree structure constructed from portions determined to be required for patching a multi-level data container in one embodiment.

FIGS. 3A-3C together illustrates the manner in which patching of a multi-level data containers storing portions of pre-installed software is performed in one embodiment. The description is continued assuming that the multi-level data containers and the files are implemented in a Java™ runtime environment (JRE) available from Sun Microsystems. However, the various features of the present invention may be implemented in other (programming) environments as well, such as .NET environment available from Microsoft™ Corporation, as will be apparent to one skilled in the relevant arts by reading the disclosure provided herein.

Broadly, in JRE, software instructions (classes) coded according to Java™ programming language, are maintained in the form of one or more class files. A collection of class files may be archived and compressed using Zip compression techniques, well known in the relevant arts, to form a Java archive (JAR) file. JAR files are generally used to distribute Java classes and associated metadata, and may contain other JAR files as well, thereby forming multi-level data containers.

Other types of Java archive files may also be generated based on the type of pre-installed software. For example, a Web Application archive (WAR) file is a Java archive file which stores XML files, Java classes (individually or as JAR files), JavaServer Pages and other objects for web applications. A Resource Adapter archive (RAR) file (not to be confused with the RAR file format) are Java archive files which store XML files, Java classes and other objects for J2EE Connector Architecture (JCA) applications. Similarly, an Enterprise archive (EAR) file is a Java archive file which contains a combination of XML files, Java classes and other objects including JAR, WAR and RAR files for enterprise applications.

Thus, it may be appreciated that in JRE, class files, XML files, JavaServer Pages, metadata files, etc., may be considered as individual/independent files, while the Java archive files such as JAR, WAR, RAR and EAR may be considered as multi-level data containers. Each of the files/data containers may be stored associated with a corresponding file name and extension (".class" for class files, ".jar" for JAR files, ".war" for WAR files, ".ear" for EAR files etc.) It may be noted that the data containers store portions of the pre-installed software/application and that the data containers are executed during execution of the pre-installed software.

Accordingly, patch tool 150 may be required to patch the multi-level data containers such as JAR, WAR and EAR files when patching the pre-installed software. As archives generally require unarchiving before a corresponding file (which can be an archive at that level or an individual file) is available for replacing, etc., the required archives are unarchived.

In one embodiment, the patches to be applied to a multi-level data container and the metadata indicating the target data containers and/or files affected by the patches are received from developer system 170 as described below with examples.

5. Patches and Metadata

FIG. 3A is a block diagram illustrating the manner in which patches are received in one embodiment. Patch set 300 represents a set of patches that are sought to be applied to a multi-level data container. Patch set 300 may be received (from developer system 170) in the form of a JAR file. Patch set 300 is shown containing patches 310 and 320, and metadata 330.

Patches 310 and 320 represent individual patches that are sought to be applied, and contain the data containers/files (such as class files 315 and 324, and jar file 328) which replace the corresponding target in the multi-level data container. Though only two patches are shown, a patch set often contains many more number/type of patches.

In general, patches 310 and 320 contain software instructions/data that fix at least some of the errors discovered during execution of the pre-installed software (in particular, the multi-level data container). The individual patches may in turn be received as a file (for example, patch 310) or as an archive file (for example, patch 320).

Metadata 330 indicates the target and their respective hierarchical paths (from the multi-level data container to the target) that are affected in the multi-level data container on application of patches 310 and 320. The metadata may be received by the patch tool 150 from the developer system 170 along with the patches to be deployed in run time system 130.

FIG. 3B depicts the format of metadata received along with the patches in one embodiment. Though the content of FIG. 3B is shown encoded in extensible markup language (XML) according to one convention, other encoding/formats and conventions may be used for representing the data.

Lines 331-341 represents the element "metadata" (between the corresponding start tag "<metadata>" and the end tag "</metadata>") indicating the details of patching to be performed by patch tool 150 more specifically the target and the hierarchical path in the multi-level data container in which the target is present. Each of lines 332-334, 335-337, 338-340 (element "jar") specify the details of a corresponding target affected by the application of patch 310 (for example, lines 332-334) and patch 320 (for example, lines 335-337 and 338-340).

Broadly, each "jar" element contains a "name" attribute indicating the name of the multi-data container sought to be patched, a "path" attribute indicating the location of the multi-level data container and a "class_name" attribute indicating the name of target affected in the multi-level data container along with its path from the multi level data container.

Thus, the three "jar" elements specify that that the patches are to be applied to the EAR file named "petapp.ear" which is stored at the location "%SWISH_HOME%/deploy/jlib/", the variable "%SWISH_HOME%" being a value maintained by JRE and which is to be substituted to determine the exact location of the EAR file. In one embodiment, "SWISH_HOME" points to the server (for example run time system 130) in which the pre-installed software is installed.

The value of the attribute "class_name" in line 334 indicates that the file "userhelper.class" is targeted by patch 310. It may be noted that the target file "userhelper.class" is to be replaced with the corresponding class file 315 contained in patch 310. In one embodiment, it is required that both the target and the replacing data containers/files have the same name and extension. As such, class file 315 correspond to a class file named "userhelper.class" containing software instructions designed to fix some of the errors discovered during execution of the pre-installed software (in particular, the EAR file "petapp.ear").

Similarly, lines 337 and 340 indicate respectively that the target file "login.class" and the target data container "shoppingcart.jar" are affected (replaced) by patch 320, and which may be respectively replaced by class file 324 and jar file 328 (contained in patch 320 as shown in FIG. 3A). Thus, metadata 330 indicates the target data containers or files that are affected in a multi-level data container to which a set of patches are sought to be applied.

On receiving patch set 300 (including metadata 330) patch tool 150 may first check whether there are any conflicts existing among the different patches (310 and 320) sought to be applied. In one embodiment, the conflict check is performed as described in detail in US application number 2007/0006209 A1 titled "Multi-level Patching Operation" having as inventors PhiDien Ha Nguyen, Shamik Ganguly and Debashis Saha, and the assignee as Oracle International Corporation, Redwood Shores, Calif. the same assignee as that of the present invention.

Broadly, conflict checking involves checking whether the same target data containers or files or the same higher level data containers containing the target data containers or files are targeted by the application of more than one patch. A conflict is deemed to exist if the same target/higher level data container or target file is targeted by at least two different patches and no conflict is deemed otherwise. The description is continued assuming that a conflict check has deemed that there exists no conflict among the patches 310 and 320 sought to be applied.

Patch tool 150 then determines a set of containers from the highest level of the multi-level data container to each target that are required for patching the target as indicated by hierarchical paths in the metadata 330. In one embodiment, the metadata received along with the patches indicates the specific paths that includes containers, directories (from multi level data container to the target), and the target required for patching the multi-level data container. It may be appreciated that the directories can be present at any place between the data containers at different levels. It may also be noted that there may not be any directories between some or all of the data containers in the path specified. Determining the containers and the directory portions (if any) required for patching the target is described below with examples.

6. Determining Containers/Portions Required for Patching

In one embodiment, metadata 330 (some or part of which is shown in FIG. 3B) indicates the specific portions (such as the lower level data containers and the directories) of the EAR file "petapp.ear" that are required for patching each of the target in the patch set 300.

The value of the attribute "name" (in a "jar" element) indicates the data container portions (as names separated by ":" after the name of the multi-level data container) that are required for patching the corresponding target. The value of the attribute "class_name" (in the same "jar" element) indicates both the data container and directory portions (as the text between the names of the multi-level data container and the target file) that are required for patching the corresponding target.

Accordingly, patch tool 150 is designed to first identify the data container portions from the value of the attribute "name".

Patch tool 150 then identifies the directory portions from the text contained in the value of the attribute "class_name" using the identified data container portions. The determined containers/portions are arranged according to the sequence in which they appear in the text, with the sequence indicating that each portion contains the subsequently occurring portion.

Thus, for the target file specified in lines 332-334, patch tool 150 determines the data container (portion) "helpers.jar" as being required for patching the target file "userhelper.class" (as indicated in line 334). Patch tool 150 then determines the text "/logic/helpers.jar/security/user" between the name of the multilevel data container "petapp.ear" and the target file "userhelper.class" in the value of the attribute "class_name" in line 334. The determined text is split using the names of the identified data container portions "helpers.jar" resulting in the four portions "/logic", "helpers.jar", "/security", and "/user" (the portions starting with "/" representing directory portions that are required for patching and helpers.jar being a container).

Thus, patch tool 150 determines the portions "/logic", "helpers.jar", "/security" and "/user" are required for patching the target file "userhelper.class" and arranges them in the sequence in which they appear in the determined text. Thus, according to the sequence, the multi-level data container "petapp.ear" contains the directory portion "/logic" which contains the data container "helpers.jar", which when unarchived, contains the directory "/security" containing the directory "/user", which in turn contains the target file "userhelper.class".

Similarly, lines 335-337 indicate that the multi-level data container "petapp.ear" contains in sequence the portions "interface.war", "/ui", "/decl", "xul2.jar", "/acme" that are required for patching the target file "login.class". Lines 338-340 indicate that the multi-level data container "petapp.ear" contains in sequence the portions "/logic", "helpers.jar", "/business" that are required for patching the target data container "shoppingcart.jar".

It may be appreciated that in an alternative embodiment, patch tool 150 may determine both the data container and directory portions directly from the value of the attribute "class_name", for example, by checking the text for file extensions (such as ".jar", ".war" and ".ear") corresponding to the Java archive files, identifying the data container portions based on the check and then identifying the directory portion as described above.

Further in one embodiment, the target affected by the application of the patches are considered as portions required for patching. As such, patch tool 150 may determine the portions of the multi-level data container corresponding to the target data containers or the target files affected by the application of patches. Thus, patch tool 150 determines the portions required for patching the target in the multi-level data container.

It may be appreciated that when multiple paths have common nodes, the container at the common node would be required for processing the patches of the corresponding paths. At least to avoid unarchiving of such containers multiple times, an embodiment of patch tool 150 constructs a tree structure from the determined containers/portions.

It may be noted that the tree structure conveniently represents the hierarchical characteristics of multi-level data containers and/or directories. Alternative techniques may be used to represent the hierarchical characteristics using other types of data structure such as stacks, queues, linked list etc as will be apparent to one skilled in the relevant arts by reading the disclosure provided herein.

As is well known, a tree structure contains one or more nodes with each "child" node having a corresponding "parent" node (represented as an edge between the nodes). The tree structure may also contain a root node (having no parent nodes), one or more leaf nodes (that do not have child nodes) and other nodes (often referred to as non-leaf nodes). Accordingly, the tree structure is constructed with the multi-level data container (sought to be patched) as the root node and the determined portions as the leaf/non-leaf nodes of the tree, with each edge representing the relation "contains" between a parent node and the child node (that is the parent node contains the child node).

Construction of the tree structure from the determined containers/portions is described below with examples.

7. Constructing a Tree Structure

FIG. 3C depicts a tree structure constructed from portions determined to be required for patching a multi-level data container in one embodiment. Tree 350 represents a tree structure constructed from the hierarchical path to the targets specified in metadata 330 (as depicted in FIG. 3B). The tree structure may be constructed in volatile and/or non-volatile memory (though portions of the structure may be maintained in secondary storage for convenience and/or efficiency).

Broadly, tree 350 is constructed by making the multilevel data container "petapp.ear" sought to be patched as the root archive/node (360), the determined data container/directory portions as corresponding non-leaf nodes (such as 365, 371, 372) and the target data containers/files as corresponding leaf nodes (381, 382, 383). The edges (shown as lines) in tree 350 indicate that a parent node "contains" the underlying child nodes.

Tree 350 may be constructed from the determined portions and the sequences in which the portions are to be arranged (as indicated by the metadata). For example, patch tool 150 may first process each sequence of determined portions (for a corresponding target) to generate a corresponding sub-tree (for example, as the path between nodes 360 and 383). Patch tool 150 may then combine the sub-trees based on the common nodes existing in the sub-trees as is well known in the arts. Alternative techniques may also be used for constructing tree 350 from the determined portions.

Figure 3D:
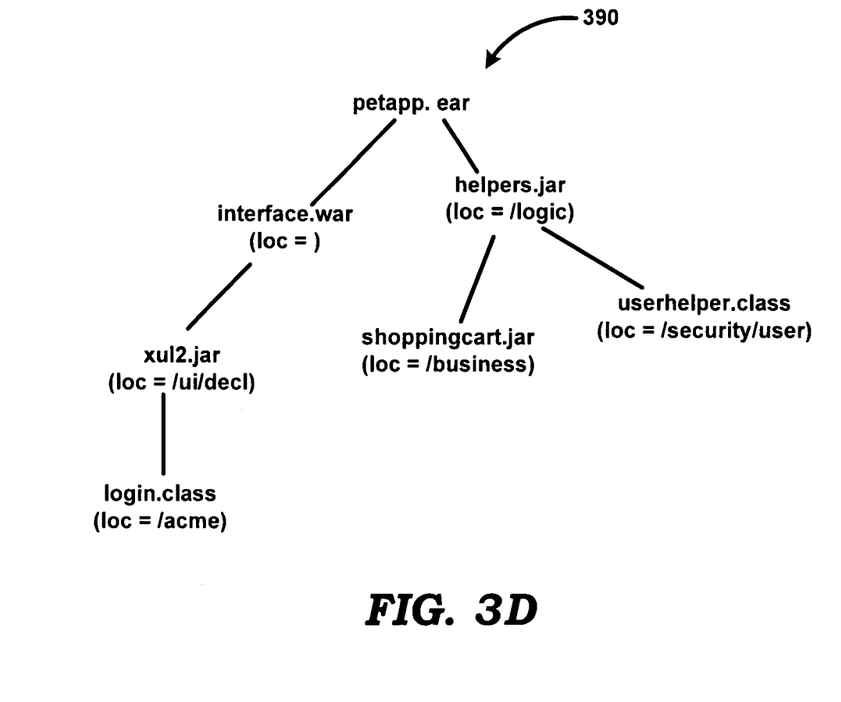
FIG. 3D depicts another tree structure constructed from portions determined to be required for patching a multi-level data container in an alternative embodiment.

It may be further appreciated that the tree structure may be constructed and/or represented in different forms. For example, FIG. 3D depicts another tree structure (390) that may be constructed from the same determined portions as tree 350, wherein nodes are constructed corresponding to the determined data container portions and the determined directory portions are maintained as the value of the variable "loc" in the corresponding node.

It may be observed that node 372 represents a data container "helpers.jar" which is required to be unarchived for patching the target data container "shoppingcart.jar" and the target file "userhelper.class". Similarly, nodes 365 and 371 represent other data container portions that are required to be unarchived for patching. Further the construction of the tree structure is useful when the patch set targets one or more files or data containers contained in the same higher level data container (for example data container helpers.jar contains the target data container shoppingcart.jar and the target file userhelper.class) thus requiring unarchiving of helpers.jar only once. The unarchiving of the data containers may be performed during the construction of tree 350 in one embodiment or during tree traversal (in another embodiment) for application of the patches.

Unarchiving and application of the patches by traversing the tree constructed based on the determined containers/portions is explained below in detail.

8. Unarchiving and Application of the Patches

Patch tool 150 traverses tree 350 and applies the patches to each of the leaf nodes (corresponding to the target data containers/files). The traversal of the tree structure may be performed in any convenient manner, for example, as a depth-first search (DFS) or a breadth-first search (BFS) well known in the relevant arts. The DFS approach may require fewer resources and accordingly the description is continued with respect to that approach.

A DFS is performed starting from the root to identify the leaf nodes of the tree structure when the target data containers or files form the leaf nodes of the constructed tree structure. Further, as described above, the application of the patches may involve the performance of different patching operations such as backup, update, verification and/or restore at each of the leaf nodes (381, 382, 383) of tree 350.

In one embodiment, patch tool 150 performs a tree traversal corresponding to each patching operation to be performed on each target. Accordingly, patch tool 150 performs a first traversal for performing backup, a second traversal for performing update and a third traversal for performing verification (and optionally a fourth traversal for restore in a scenario that the verification indicates failure of the update operation). Alternatively, the one or more operations may be performed at each leaf node before continuing the traversal of the tree structure.

For convenience of processing leaf nodes, the traversal of tree 350 is performed using a depth-first search (DFS), wherein the traversal is performed by giving preference to child nodes over sibling nodes (nodes that have the same parent node). Thus, according to a DFS traversal, the order of visiting the nodes/portions of tree 350 is "petapp.ear", "interface.war", "/ui", "/decl", "xul2.jar", "/acme", "login.class" (leaf node 381), "/logic", "helpers.jar", "/business", "shoppingcart.jar" (leaf node 382), "/security", "/user", and "userhelper.class" (leaf node 383). It should be noted multiple performances of the same DFS traversal may result in different order of visiting the nodes of tree 350.

Thus, during traversal, when node 360 is reached, patch tool 150 unarchives the multi-level data container "petapp.ear" to extract the lower level portions "interface.war" and "/logic" directory (corresponding to the child nodes of node 360). Similarly, for node 365 (and similar data container portions), the data container "interface.war" is unarchived to extract the "/ui" directory. For the nodes "/ui" and "/decl" (and similar directory portions), patch tool 150 may check whether such directories exists in the unarchived portions.

On reaching node 381 (or similar leaf nodes), patch tool 150 performs the specific one of the patching operations such as backup (making a copy of "login.class" file to a pre-specified storage location), update (replace the "login.class" file with class file 324 (contained in patch 320)), verification (check whether the checksum calculated for class file 324 is equal to a pre-specified value), and optionally restore (replace class file 324 with "login.class" copy from the pre-specified storage location, typically when the verification fails).

Similarly, patch tool 150 performs the patching operations on reaching (other) leaf nodes 382 and 383 to cause (after successful verification) the "shoppingcart.jar" data container to be replaced by data container 328 and the "userhelper.class" file to be replaced by class file 315. It may be observed that the replacement of the target data containers/files such as "login.class" by class file 324, modifies the higher level determined (unarchived) portions such as "/acme", "xul2.jar", "/decl", "/ui" and "interface.war". Patch tool continues to traverse the tree and unarchive the required data containers and apply the patches until all the patches in the received set of patches are applied thus applying all the received patches on the multi-level data container.

It is necessary that each of the determined portions be archived in the containing portion for generating the patched multi level data container.

Patch tool 150 archives the modified portion "/acme" along with the unarchived portions of the original "xul2.jar" to generate the modified "xul2.jar". Similarly, the modified portion "/ui" (containing the modified "/decl" containing the modified "xul2.jar") is archived with the unarchived portions of the original "interface.war" to generate the modified "interface.war".

Patch tool 150 then generates the patched multi-level data container "petapp.ear" from the modified portions "interface.war" and "/logic" and other (unarchived) portions of the original "petapp.ear". The patched "petapp.ear" now forms part of the software/application pre-installed in run time system 130, and as such executed during execution of the pre-installed software. The execution of the patched "petapp.ear" may be performed without the occurrence of at least some of the errors discovered before the application of the patches.

Thus, patch tool 150 performs the patching of multi-level data containers storing portions of pre-installed software. It may be appreciated that by constructing a tree structure from the portions determined to be required for patching, only the necessary portions (data containers) contained in the multi-level data container are unarchived. In particular, the containers which are not in the path to a target need not be archived. Such containers are not shown in FIG. 3C, as not being indicated in the meta data. By avoiding unarchiving of such containers, the time and resources required for the application of the patches may be reduced.

Further, by forming a tree structure, duplication unarchiving of containers may be avoided. Thus, containers such as helpers.jar are unarchived only once, though present in two paths.

It should be further appreciated that the above-described features of patch tool 150 may be implemented in a combination of one or more of hardware, software, and firmware (though the below embodiment is described as being implemented in the form of software instructions). The description is continued with respect to an embodiment in which various features are operative by execution of corresponding software instructions.

9. Digital Processing System

Figure 4:
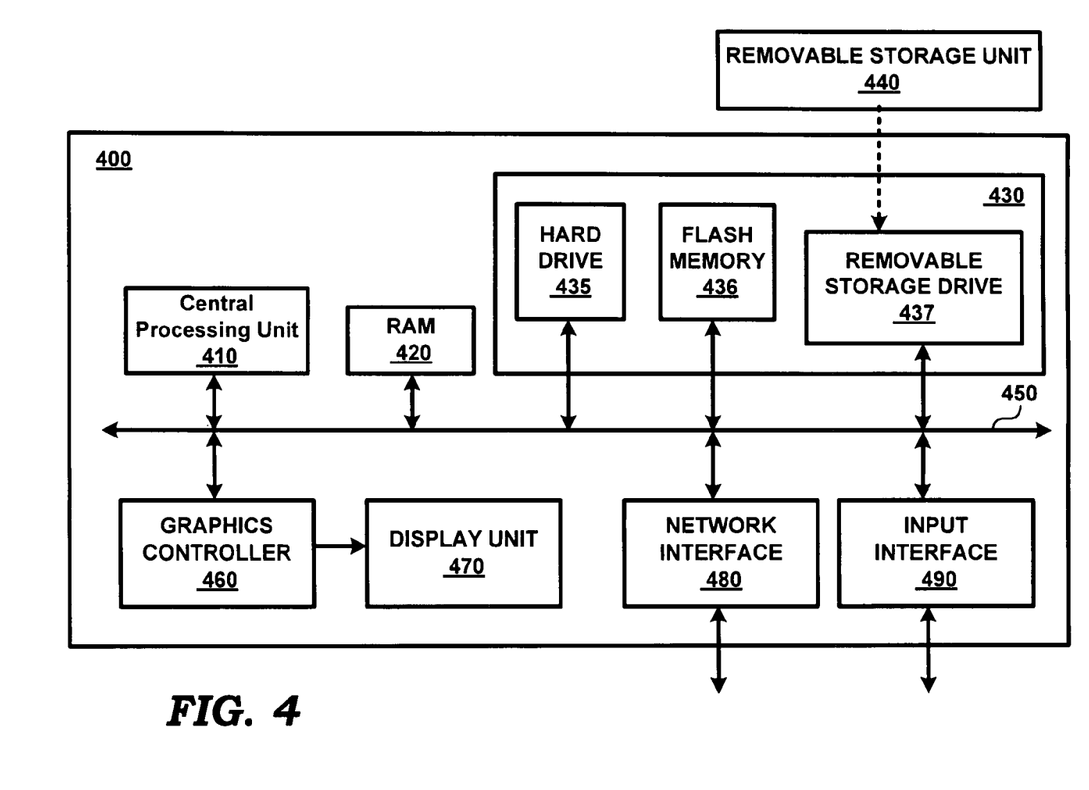
FIG. 4 is a block diagram illustrating the details of a digital processing system in which various aspects of the present invention are operative by execution of appropriate software instructions.

FIG. 4 is a block diagram illustrating the details of digital processing system 400 in which various aspects of the present invention are operative by execution of appropriate software instructions. Digital processing system 400 may correspond to any system executing patch tool 150.

System 400 may contain one or more processors a central processing unit (CPU) 410, random access memory (RAM) 420, secondary memory 430, graphics controller 460, display unit 470, network interface 480, and input interface 490. All the components except display unit 470 may communicate with each other over communication path 450, which may contain several buses as is well known in the relevant arts. The components of FIG. 4 are described below in further detail.

CPU 410 may execute instructions stored in RAM 420 to provide several features of the present invention. CPU 410 may contain multiple processing units, with each processing unit potentially being designed for a specific task. Alternatively, CPU 410 may contain only a single general purpose processing unit. RAM 420 may receive instructions from secondary memory 430 using communication path 450.

Graphics controller 460 generates display signals (e.g., in RGB format) to display unit 470 based on data/instructions received from CPU 410. Display unit 470 contains a display screen to display the images defined by the display signals. Input interface 490 may correspond to a keyboard and a pointing device (e.g., touch-pad, mouse). Network interface 480 provides connectivity to a network (e.g., using Internet Protocol), and may be used to communicate with others connected systems of FIG. 1.

Secondary memory 430 may contain hard drive 435, flash memory 436 and removable storage drive 437. Secondary memory 430 may store the data (e.g., metadata shown in FIG. 3B and the tree structure shown in FIG. 3C/3D) and software instructions, which enable system 400 to provide several features in accordance with the present invention.

Some or all of the data and instructions may be provided on removable storage unit 440, and the data and instructions may be read and provided by removable storage drive 437 to CPU 410. Floppy drive, magnetic tape drive, CD-ROM drive, DVD Drive, Flash memory, removable memory chip (PCMCIA Card, EPROM) are examples of such removable storage drive 437.

Removable storage unit 440 may be implemented using medium and storage format compatible with removable storage drive 437 such that removable storage drive 437 can read the data and instructions. Thus, removable storage unit 440 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 440 or hard disk installed in hard drive 435. These computer program products are means for providing software to digital processing system 400. CPU 410 may retrieve the software instructions, and execute the instructions to provide various features of the present invention described above.

It should be understood that numerous specific details, relationships, and methods are set forth to provide a full understanding of the invention. For example, many of the functions units described in this specification have been labeled as modules/blocks in order to more particularly emphasize their implementation independence.

A module/block may be implemented as a hardware circuit containing custom very large scale integration circuits or gate arrays, off-the-shelf semiconductors such as logic chips, transistors or other discrete components. A module/block may also be implemented in programmable hardware devices such as field programmable gate arrays, programmable array logic, programmable logic devices, or the like.

Modules/blocks may also be implemented in software for execution by various types of processors. An identified module of executable code may, for instance, contain one or more physical or logical blocks of computer instructions which may, for instance, be organized as an object, procedure, or function. Nevertheless, the executables of an identified module need not be physically located together, but may contain disparate instructions stored in different locations which when joined logically together constitute the module/block and achieve the stated purpose for the module/block.

It may be appreciated that a module/block of executable code could be a single instruction, or many instructions and may even be distributed over several code segments, among different programs, and across several memory devices. Further, the functionality described with reference to a single module/block can be split across multiple modules/blocks or alternatively the functionality described with respect to multiple modules/blocks can be combined into a single (or other combination of blocks) as will be apparent to a skilled practitioner based on the disclosure provided herein.

Similarly, operational data may be identified and illustrated herein within modules and may be embodied in any suitable form and organized within any suitable type of data structure. The operational data may be collected as a single data set, or may be distributed over different locations including over different member disks, and may exist, at least partially, merely as electronic signals on a system or network.

Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

Furthermore, the described features, structures, or characteristics of the invention may be combined in any suitable manner in one or more embodiments. In the following description, numerous specific details are provided such as examples of programming, software modules, user selections, network transactions, database queries, database structures, hardware modules, hardware circuits, hardware chips, etc., to provide a thorough understanding of embodiments of the invention.

10. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

It should be understood that the figures and/or screen shots illustrated in the attachments highlighting the functionality and advantages of the present invention are presented for example purposes only. The present invention is sufficiently flexible and configurable, such that it may be utilized in ways other than that shown in the accompanying figures.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method of applying patches to a multi-level data container archived as a first file, wherein said multi-level data container contains a plurality of containers and a plurality of files at a plurality of levels in a hierarchical manner such that said first file having said plurality of files represents a software pre-installed on a digital processing system, wherein each of said plurality of containers is in the form of a corresponding archive file containing a collection of files, said method comprising:

receiving a set of patches to be applied to said multi-level data container, each of said set of patches being directed to a corresponding one of a set of targets, each target representing a file or container located in one of said plurality of containers;

determining a superset of containers comprised in said plurality of containers, said superset of containers including a root container representing said multi-level data container and a corresponding set of containers in the path from said root container to each of said set of targets, wherein the set of containers in at least some of the paths to respective targets includes a corresponding container in addition to the target such that the number of containers in said superset of containers is more than that in said set of targets;

unarchiving each of said superset of containers to generate corresponding one of a plurality of sets of unarchived files, wherein unarchiving a container in said superset of containers comprises extracting the collection of files contained in the archive file corresponding to the container such that the set of unarchived files for the container contains the extracted collection of files;

applying each of said set of patches to the corresponding one of said set of targets in said sets of unarchived files to generate updated versions of said plurality of sets of unarchived files; and generating an updated version of said multi-level data container by archiving said updated versions of said plurality of sets of unarchived files into updated versions of respective containers, wherein said updated version of said multi-level data container is generated in the form of a second file such that said second file having the updated versions of said plurality of files and said plurality of containers represents said software, whereby a number of containers in said superset of containers is less than a number of containers in said plurality of containers if any of said plurality of containers is not required to be unarchived to perform said applying.

2. The method of claim 1, further comprising receiving a metadata indicating a respective hierarchical path at which each of said targets is present in said multi-level data container, said determining and applying together comprising:

forming a tree from said respective hierarchical paths, wherein said tree contains a plurality of nodes with the location of each node in the tree being determined by said respective hierarchical path, wherein each of said plurality of nodes is one of a container and file;

traversing said tree in a traversal order until one of said superset of containers and said set of targets is reached at a corresponding node of said tree, wherein the traversed node is processed according to:
  if one of said superset of containers is reached, unarchiving the reached container; and
  if one of said set of targets is reached, performing said applying,
  wherein each node of said tree is traversed only once for said unarchiving and said applying, wherein after said traversing of all of said plurality of nodes once, the updated versions of the files and containers are ready for said archiving.

3. The method of claim 2, wherein said traversal order is one of said depth first search (DFS) and breadth first search (BFS).

4. The method of claim 2, wherein said applying comprises a backup operation and then an update operation, wherein each of said backup operation and said update operation is performed by one traversal of said tree.

5. The method of claim 4, wherein said traversal for said backup operation is performed only after a conflict check indicates absence of conflicts in said set of targets.

6. The method of claim 2, wherein said meta data further specifies a list of containers in each of said hierarchical paths, wherein said determining includes the containers of each of said list of containers in forming said superset of containers.

7. The method of claim 6, wherein each hierarchical path includes a sequence of parts at corresponding sequence of levels, wherein a part at a last level is a file name of the corresponding target and the remaining ones of said sequence of parts is either one of said list of containers or a corresponding directory name, such that the hierarchical path uniquely identifies the target in said multi-level data container.

8. A digital processing system for applying patches to a multi-level data container archived as a first file, wherein said multi-level data container contains a plurality of containers and a plurality of files at a plurality of levels in a hierarchical manner, wherein each of said plurality of containers is in the form of a corresponding archive file containing a collection of files, said digital processing system comprising:

a memory to store instructions;

a processor to retrieve and execute said instruction stored in said memory, wherein execution of said instruction causes said digital processing system to perform the actions of:

receiving a set of patches to be applied to said multi-level data container, each of said set of patches being directed to a corresponding one of a set of targets, each target representing a file or container located in one of said plurality of containers, wherein said set of targets include multiple containers located at multiple levels of said plurality of levels;

determining a superset of containers comprised in said plurality of containers, said superset of containers including a root container representing said multi-level data container and a corresponding set of containers in the path from said root container to each of said set of targets, wherein the set of containers in at least some of the paths to respective targets includes a corresponding container in addition to the target such that the number of containers in said superset of containers is more than that in said set of targets, wherein said plurality of containers includes a third container that is determined not to be one of said superset of containers;

unarchiving each of said superset of containers to generate corresponding one of a plurality of sets of unarchived files, wherein unarchiving a container in said superset of containers comprises extracting the collection of files contained in the archive file corresponding to the container such that the set of unarchived files for the container contains the extracted collection of files;

applying each of said set of patches to the corresponding one of said set of targets in said sets of unarchived files to generate updated versions of said plurality of sets of unarchived files; and generating an updated version of said multi-level data container by archiving said updated versions of said plurality of sets of unarchived files into updated versions of respective containers, wherein said unarchiving is not performed with respect to at least said third container, whereby said unarchiving is performed for a fewer number of containers than a number of containers in said plurality of containers if any of said plurality of containers is not required to be unarchived to perform said applying.

9. The digital processing system of claim 8, further performing the actions of receiving a metadata indicating a respective hierarchical path at which each of said targets is present in said multi-level data container, wherein said determining and applying together comprises performing the actions of:
forming a tree from said respective hierarchical paths, wherein said tree contains a plurality of nodes with the location of each node in the tree being determined by said respective hierarchical path, wherein each of said plurality of nodes is one of a container and file;
traversing said tree in a traversal order until one said superset of containers and said set of targets is reached at a corresponding node of said tree, wherein the traversed node is processed according to:
if one of said superset of containers is reached, unarchiving the reached container; and
if one of said set of targets is reached, performing said applying,
wherein each node of said tree is traversed only once for said unarchiving and said applying,
wherein after said traversing of all of said plurality of nodes once, the updated versions of the files and containers are ready for said archiving.

10. The digital processing system of claim 9, wherein said traversal order is one of said depth first search (DFS) and breadth first search (BFS).

11. The digital processing system of claim 9, wherein said applying comprises a backup operation and then an update operation,
wherein each of said backup operation and said update operation is performed by one traversal of said tree.

12. The digital processing system of claim 11, wherein said the traversal for said backup operation is performed only after a conflict check indicates absence of conflicts in said set of targets.

13. The digital processing system of claim 9, wherein said meta data further specifies a list of containers in each of said hierarchical paths, wherein said determining includes the containers of each of said list of containers in forming said superset of containers.

14. The digital processing system of claim 13, wherein each hierarchical path includes a sequence of parts at corresponding sequence of levels, wherein a part at a last level is a file name of the corresponding target and the remaining ones of said sequence of parts is either one of said list of containers or a corresponding directory name, such that the hierarchical path uniquely identifies the target in said multi-level data container.

15. A non-transitory machine readable medium storing one or more sequences of instructions for causing a system to apply patches to a multi-level data container archived as a first file, wherein said multi-level data container contains a plurality of containers and a plurality of files at a plurality of levels in a hierarchical manner such that said first file having said plurality of files represents a software pre-installed on said system, wherein each of said plurality of containers is in the form of a corresponding archive file containing a collection of files, wherein execution of said one or more sequences of instructions by one or more processors contained in said system causes said system to perform the actions of:
receiving a set of patches to be applied to said multi-level data container, each of said set of patches being directed to a corresponding one of a set of targets, each target representing a file or container located in one of said plurality of containers;
determining a superset of containers comprised in said plurality of containers, said superset of containers including a root container representing said multi-level data container and a corresponding set of containers in the path from said root container to each of said set of targets, wherein the set of containers in at least some of the paths to respective targets includes a corresponding container in addition to the target such that the number of containers in said superset of containers is more than that in said set of targets;
unarchiving each of said superset of containers to generate corresponding one of a plurality of sets of unarchived files, wherein unarchiving a container in said superset of containers comprises extracting the collection of files contained in the archive file corresponding to the container such that the set of unarchived files for the container contains the extracted collection of files;
applying each of said set of patches to the corresponding one of said set of targets in said sets of unarchived files to generate updated versions of said plurality of sets of unarchived files; and
generating an updated version of said multi-level data container by archiving said updated versions of said plurality of sets of unarchived files into updated versions of respective containers,
wherein said updated version of said multi-level data container is generated in the form of a second file such that said second file having the updated versions of said plurality of files and said plurality of containers represents said software,
whereby a number of containers in said superset of containers is less than a number of containers in said plurality of containers if any of said plurality of containers is not required to be unarchived to perform said applying.

16. The non-transitory machine readable medium of claim 15, further comprising one or more instructions for receiving a metadata indicating a respective hierarchical path at which each of said targets is present in said multi-level data container, said determining and applying together comprising one or more instructions for:
forming a tree from said respective hierarchical paths, wherein said tree contains a plurality of nodes with the location of each node in the tree being determined by said respective hierarchical path, wherein each of said plurality of nodes is one of a container and file;
traversing said tree in a traversal order until one of said superset of containers and said set of targets is reached at a corresponding node of said tree, wherein the traversed node is processed according to:
if one of said superset of containers is reached, unarchiving the reached container; and
if one of said set of targets is reached, performing said applying,
wherein each node of said tree is traversed only once for said unarchiving and said applying,
wherein after said traversing of all of said plurality of nodes once, the updated versions of the files and containers are ready for said archiving.

17. The non-transitory machine readable medium of claim 16, wherein said traversal order is one of said depth first search (DFS) and breadth first search (BFS).

18. The non-transitory machine readable medium of claim 16, wherein said applying comprises a backup operation and then an update operation,
   wherein each of said backup operation and said update operation is performed by one traversal of said tree.

19. The non-transitory machine readable medium of claim 18, wherein said the traversal for said backup operation is performed only after a conflict check indicates absence of conflicts in said set of targets.

20. The non-transitory machine readable medium of claim 16, wherein said meta data further specifies a list of containers in each of said hierarchical paths, wherein said determining includes the containers of each of said list of containers in forming said superset of containers.

* * * * *

UNITED STATES PATENT AND TRADEMARK OFFICE
CERTIFICATE OF CORRECTION

PATENT NO.         : 8,443,357 B2
APPLICATION NO.    : 12/250537
DATED              : May 14, 2013
INVENTOR(S)        : Nguyen et al.

Page 1 of 1

It is certified that error appears in the above-identified patent and that said Letters Patent is hereby corrected as shown below:

In the Specification:

In column 5, line 4, delete "a a set" and insert -- a set --, therefor.

Signed and Sealed this
Tenth Day of September, 2013

Teresa Stanek Rea
*Acting Director of the United States Patent and Trademark Office*